(12) United States Patent
Beppu et al.

(10) Patent No.: US 8,414,020 B2
(45) Date of Patent: Apr. 9, 2013

(54) AIRBAG DEVICE

(75) Inventors: Yoshinori Beppu, Yokohama (JP);
Hidenori Suzuki, Yokohama (JP);
Tsubana Nakamura, Yokohama (JP);
Akihiko Narui, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/054,424

(22) PCT Filed: Jul. 7, 2009

(86) PCT No.: PCT/JP2009/003155
§ 371 (c)(1),
(2), (4) Date: Jan. 14, 2011

(87) PCT Pub. No.: WO2010/007740
PCT Pub. Date: Jan. 21, 2010

(65) Prior Publication Data
US 2011/0127755 A1 Jun. 2, 2011

(30) Foreign Application Priority Data
Jul. 17, 2008 (JP) .................................. 2008-186355

(51) Int. Cl.
*B60R 21/232* (2011.01)
*B60R 21/2334* (2011.01)
*B60R 21/237* (2006.01)
*B60R 21/201* (2011.01)
*B60R 21/213* (2011.01)

(52) U.S. Cl. ................ 280/730.2; 280/728.2; 280/743.2

(58) Field of Classification Search .............. 280/730.2, 280/728.2, 730.1, 743.2, 728.1; *B60R 21/232, B60R 21/2334, 21/237, 21/201, 21/213, 21/2155, B60R 21/215, 21/20, 21/16*
See application file for complete search history.

(56) References Cited

U.S. PATENT DOCUMENTS 7,380,815 B2 * 6/2008 Rose et al. ................. 280/730.2
2002/0195803 A1 12/2002 Terbu et al.

FOREIGN PATENT DOCUMENTS

| DE | 102007000343 | * | 3/2008 |
| JP | 61-046824 U | | 3/1986 |
| JP | 2003-170798 A | | 6/2003 |
| JP | 2003-237514 A | | 8/2003 |
| JP | 2004-098783 A | | 4/2004 |

(Continued)

OTHER PUBLICATIONS

International Search Report for International Application No. PCT/JP2009/003155, dated Aug. 4, 2009, 2 pages.

*Primary Examiner* — Faye M Fleming
*Assistant Examiner* — Keith Frisby
(74) *Attorney, Agent, or Firm* — Brinks Hofer Gilson & Lione

(57) ABSTRACT

An object of the present invention is to ensure smooth deployment of an airbag having a turned-back end portion. The present invention is an airbag device that expands and deploys in a curtain shape on a side portion of a vehicle interior in order to protect an occupant of the vehicle interior, where the airbag includes a gas generator for generating an expansion gas and an airbag that deploys when it is expanded by the gas supplied from the gas generator. The airbag is compressed into an elongated shape when stowed and an end portion of the elongated airbag is turned back in a lengthwise direction, thereby forming an airbag main portion that is not turned back and the turned-back end portion. A restricting member is also provided to restrict deployment of the turned-back end portion of the airbag toward a vehicle outer side when the device is activated.

9 Claims, 9 Drawing Sheets

FOREIGN PATENT DOCUMENTS

| | | |
|---|---|---|
| JP | 2004-338542 A | 12/2004 |
| JP | 2005-519797 A | 7/2005 |
| JP | 2006-248420 A | 9/2006 |
| JP | 2007-015760 A | 1/2007 |
| JP | 2007-055545 A | 3/2007 |
| JP | 2007126033 A * | 5/2007 |

* cited by examiner

AIRBAG DEVICE

This application is a National Stage of International Application No. PCT/JP2009/003155 filed on Jul. 7, 2009, which claims priority to Japanese Patent Application No. JP 2008-186355 filed with the Japanese Patent Office on Jul. 17, 2008, the entirety of which are hereby incorporated by reference.

BACKGROUND

1. Technical Field

The present invention relates to a so-called curtain airbag device in which an airbag attached to a vehicle cabin inner side portion protects an occupant during a vehicle collision by deploying between a vehicle body side wall and the occupant.

2. Background Information

Patent Document 1 discloses an airbag device that is stowed in a side portion of an upper wall of a vehicle body such that a rear edge portion of a folded airbag is turned back in a front-rear direction of the vehicle.

Patent Document 1: Japanese Patent Application Laid-open No. 2007-55545

However, with the airbag device described in Patent Document 1, the turned-back rear end portion of the airbag deploys to a vehicle outer side rather than a vehicle inner side, and therefore the airbag may enter in between a pillar garnish and a pillar. As a result, the airbag cannot deploy smoothly.

BRIEF SUMMARY

The present invention has been designed in consideration of the conventional problem described above, and an object thereof is to provide a structure that allows an airbag to deploy smoothly.

The present invention is an airbag device that expands and deploys in a curtain shape on a side portion of a vehicle interior in order to protect an occupant of the vehicle interior, including: a gas generator for generating an expansion gas; and an airbag that deploys when expanded by the gas supplied from the gas generator. The airbag is compressed into an elongated shape when stowed and an end portion of the elongated airbag is turned back in a lengthwise direction, thereby forming an airbag main portion that is not turned back and a turned-back end portion. Further, a restricting member is provided to restrict deployment of the turned-back end portion of the airbag toward a vehicle outer side when the device is activated.

With the airbag device according to the present invention, the turned-back end portion of the airbag is guided by the restricting member so as to deploy to a vehicle inner side rather than the vehicle outer side, and therefore a situation in which the airbag infiltrates between a pillar garnish and a pillar can be avoided. As a result, the airbag can be deployed smoothly.

Figure 1:
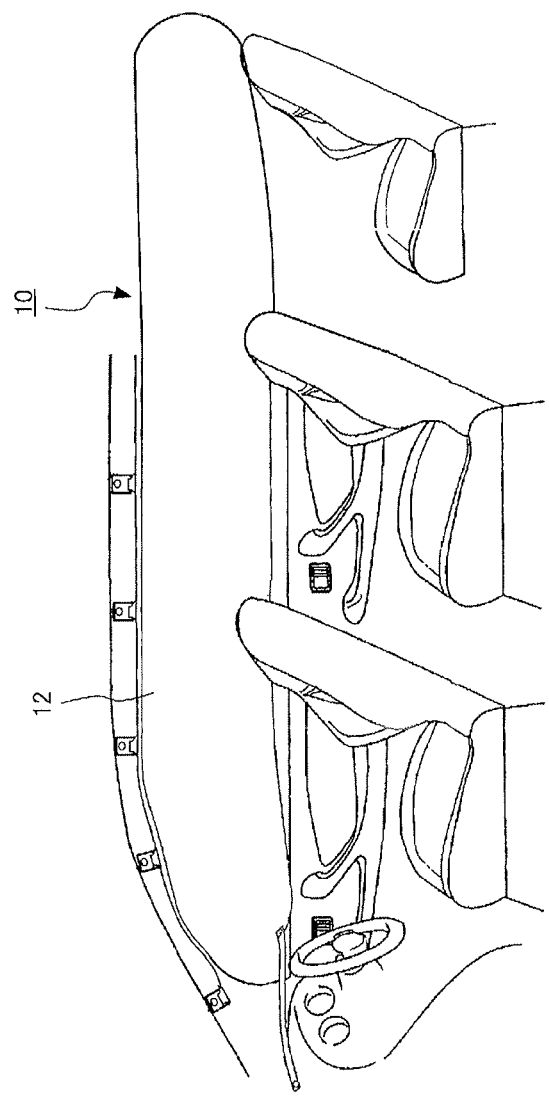
FIG. 1 is a sectional view showing a cabin part of a vehicle that includes a curtain airbag device according to an embodiment of the present invention.

EXPLANATION OF REFERENCE NUMERALS 10 curtain airbag device
12 airbag
12a airbag main portion
12c turned-back end portion
14 restricting member
14a upper side end portion
14b lower side end portion
30 protective member
34 stretching region
38 slit

DETAILED DESCRIPTION OF THE DRAWINGS AND THE PRESENTLY PREFERRED EMBODIMENTS

An embodiment of the present invention will be described below with reference to the drawings. FIG. 1 is a sectional view showing a cabin part of an automobile that includes a curtain airbag device 10 according to an embodiment of the present invention. As shown in FIG. 1, an inner panel covered by a head lining is provided above a cabin side window pane. The curtain airbag device 10 is fixed to the inner panel by a bolt using a bracket.

The curtain airbag device 10 is stowed while covered by the head lining disposed on a window upper edge of the vehicle, and includes an airbag 12 that expands when the curtain airbag device 10 is activated so as to deploy downward from a gap between the head lining and an inner panel, thereby protecting an occupant of the vehicle, and a gas supply device (not shown) for supplying an expansion gas to the airbag 12.

When an emergency such as an overturn, a side-on collision, or a rollover accident occurs while the vehicle is moving, a sensor provided in the vehicle detects resulting irregular vibration and transmits an ignition signal to an inflator, which is not shown in the drawings, on the basis of an impact signal. A propellant that drives the inflator upon reception of the ignition signal from the sensor is provided in the interior of the inflator. When the inflator is activated, the interior of the airbag 12 is filled with the expansion gas, and as a result, the airbag 12 deploys such that the head lining is pushed open (flicked away). A side face of the window pane is covered by the deployed airbag 12, and therefore the occupant of the vehicle is protected.

Figure 2:
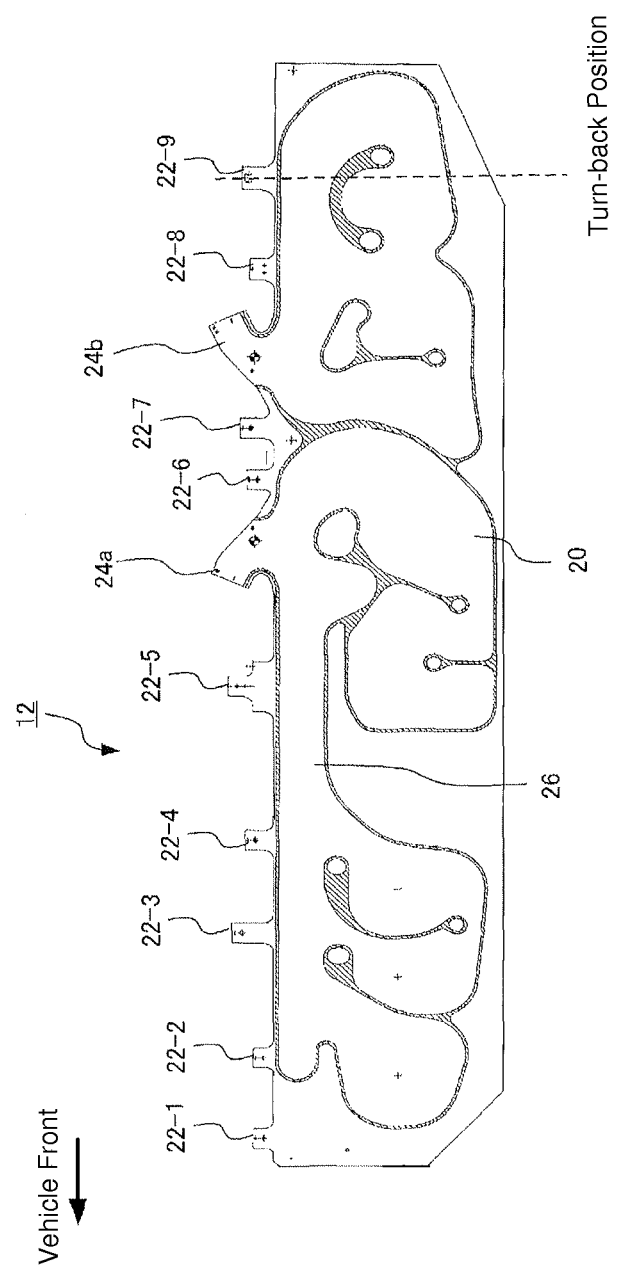
FIG. 2 is a plan view showing a structure of an airbag used in the curtain airbag device according to this embodiment of the present invention.

FIG. 2 is a plan view showing the airbag 12 in a deployed state. The airbag 12 may be constituted by a bag-shaped component formed by sewing, adhering, or welding together a plurality of overlapped sheets (two or three, for example), or by a component formed by weaving a single sheet into a bag shape.

The airbag 12 includes gas introduction portions 24a, 24b for leading the gas supplied from the inflator (not shown) to the interior of the airbag 12, attachment tabs 22-1 to 22-9 provided in a plurality on an upper edge portion, a plurality of chambers 20 expanded by the gas, and a duct 26 for leading the gas introduced through the gas introduction portions 24a, 24b into the respective chambers 20. Note that in this embodiment, a case in which two inflators are used will be described as an example, but it goes without saying that the present invention may be applied to a case in which a single inflator is used.

Figure 3:
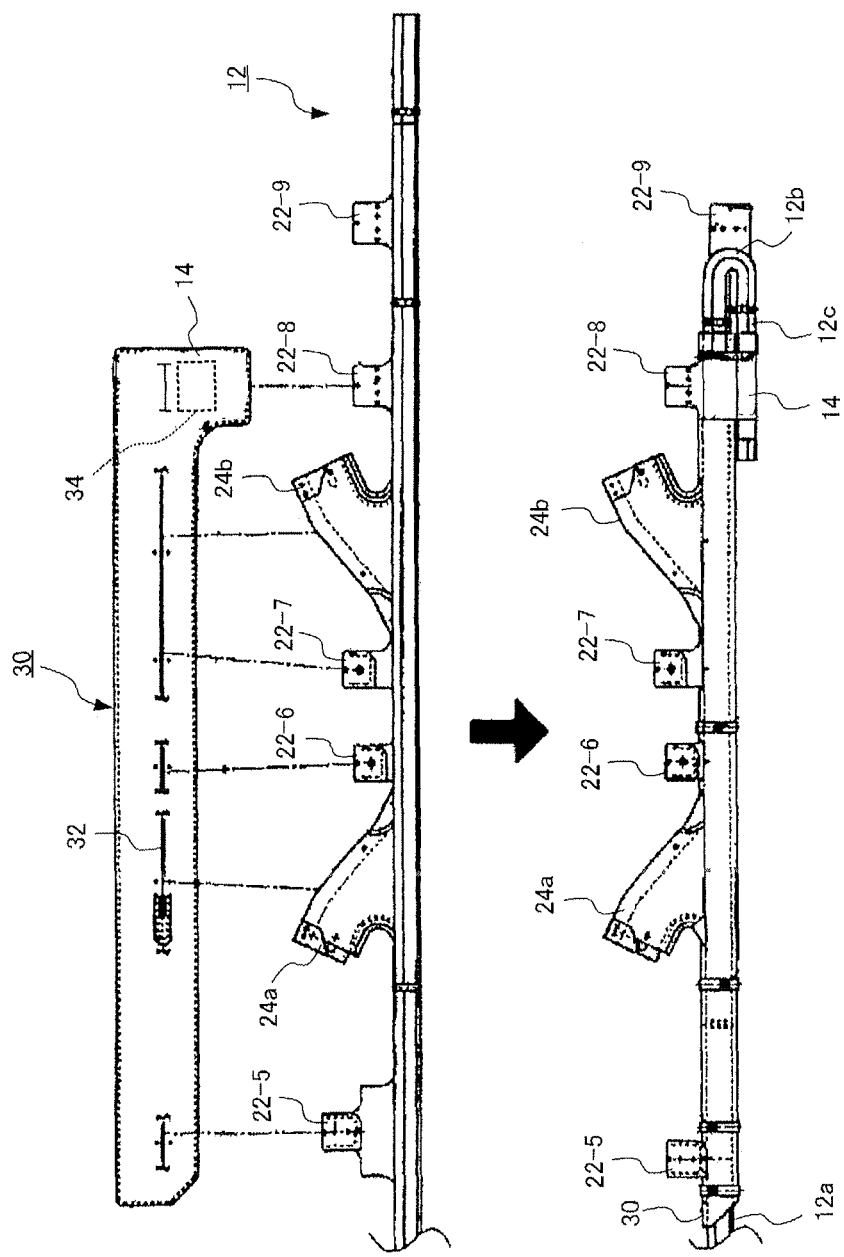
FIG. 3 is an illustrative view showing a part of a process for assembling (folding) the airbag used in the curtain airbag device according to this embodiment of the present invention.

FIG. 3 is an illustrative view showing a part of a process for assembling (folding) the airbag used in the curtain airbag device according to this embodiment. When stowed, the airbag 12 is wound up into a roll shape to form a substantially rod-shaped roll, and a rear end of the roll is turned back toward a lower side. Here, the part that is not turned back will be referred to as an airbag main portion 12a and the part that is turned back will be referred to as a turned-back end portion 12c. A method of folding the airbag 12 into a spiral shape or the like instead of a roll shape may be employed as a method of compressing the airbag 12. Further, the present invention functions effectively when the turned-back end portion 12c is turned back in a direction heading toward a vehicle inner side or a vehicle outer side instead of the lower side. However, turning back the turned-back end portion 12c toward the lower side is particularly effective.

First, the airbag 12 is rolled up from a lower edge portion side thereof from the deployed state shown in FIG. 2 to form the substantially rod-shaped roll shown in the upper drawing of FIG. 3. Next, a fabric protective member 30 is wrapped around an outer periphery of the wound airbag 12 from an upper side. At this time, gas introduction ports 24a, 24b and the tabs 22-5 to 22-8 of the airbag 12 are inserted into slits 32 provided in the protective member 32.

Figure 4:
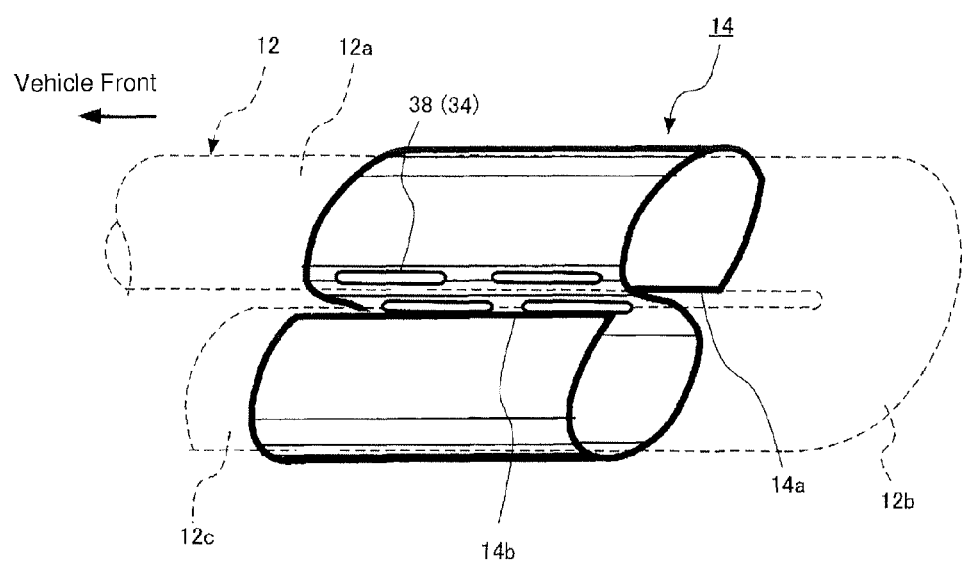
FIG. 4 is an illustrative view (perspective view) showing a structure of a restricting member used in the curtain airbag device according to this embodiment of the present invention.

A deployment restricting portion 14 for restricting a deployment direction of the airbag 12 is provided on a rear end portion of the protective member 30. In the embodiment shown in FIG. 3, the deployment restricting portion 14 is formed as a part of the protective member 30, but the deployment restricting portion 14 may be formed as an independent member. As shown in FIG. 4, the deployment restricting portion 14 is wound into an S shape between the airbag main portion 12a and the turned-back end portion 12c of the airbag 12 that is wound up into a roll shape. In FIG. 4, a reference symbol 12b denotes the turned-back part of the airbag 12. Note that the structure of the deployment restricting portion 14 will be described in detail below.

After being enveloped by the protective member 30 including the deployment restricting portion 14, the airbag 12 is fixed to a bracket, not shown in the drawings, by tape. The airbag 12 fixed to the bracket is then fixed to the vehicle body.

Figure 5:
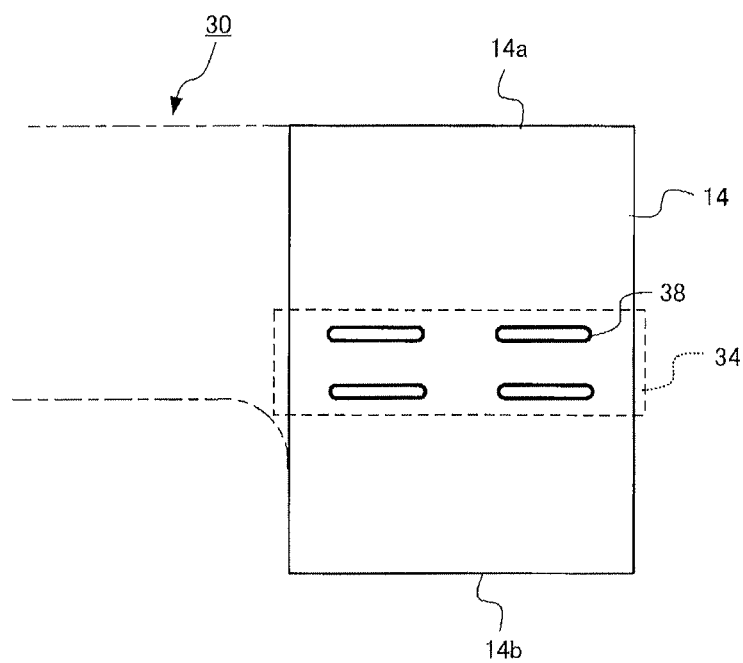
FIG. 5 is an illustrative view (plan view) showing the structure of the restricting member used in the curtain airbag device according to this embodiment of the present invention.

FIG. 5 is an illustrative view (plan view) showing the structure of the deployment restricting member 14. As shown in FIGS. 4 and 5, the deployment restricting member 14 restricts deployment of the turned-back end portion 12c of the airbag 12 toward the vehicle outer side when the airbag device is activated. In other words, the deployment restricting member 14 guides the deployment direction of the turned-back end portion 12c to the vehicle inner side.

The restricting member 14 is wound into a form having an S-shaped cross-section that passes between the airbag main portion 12a and the turned-back end portion 12c from a vehicle inner side surface of the airbag main portion 12a, and is disposed so as to cover a vehicle outer side surface of the end portion 12c. The restricting member 14 takes the form of a strip that extends in a substantially orthogonal direction to a lengthwise direction of the airbag 12, and may be formed from a material other than fabric, such as resin.

The restricting member 14 includes an upper side end portion 14a and a lower side end portion 14b, where the lower side end portion 14b extends to the vehicle inner side from a bottom portion of the turned-back end portion 12c. As shown in FIG. 3, a slit is provided in a part of the restricting member 14, and the tab 22-8 provided on the airbag main portion 12a is passed through the slit to connect the restricting member 14 and the airbag 12.

As shown in FIGS. 4 and 5, a stretching region 34 that can stretch more easily than other parts is formed near a center of the restricting member 14. In this embodiment, the stretching region 34 is realized by slits 38. The slits 38 are formed in four parallel locations. Note that the shape, size, number, and so on of the slits 38 may be modified appropriately. When the restricting member 14 is made of resin, for example, the stretching region 34 can be realized by a thin region having less thickness than the other parts.

The stretching region 34 is preferably disposed in a location corresponding to the duct 26 provided in the upper edge part of the airbag 12, as shown in FIG. 2. When the airbag device is activated such that the airbag 12 expands and deploys, a pressure in the interior of the airbag 12 rises rapidly, but due to the existence of the stretching region 34, a situation in which a flow of the expansion gas is stemmed (choked) can be avoided.

Figure 6:
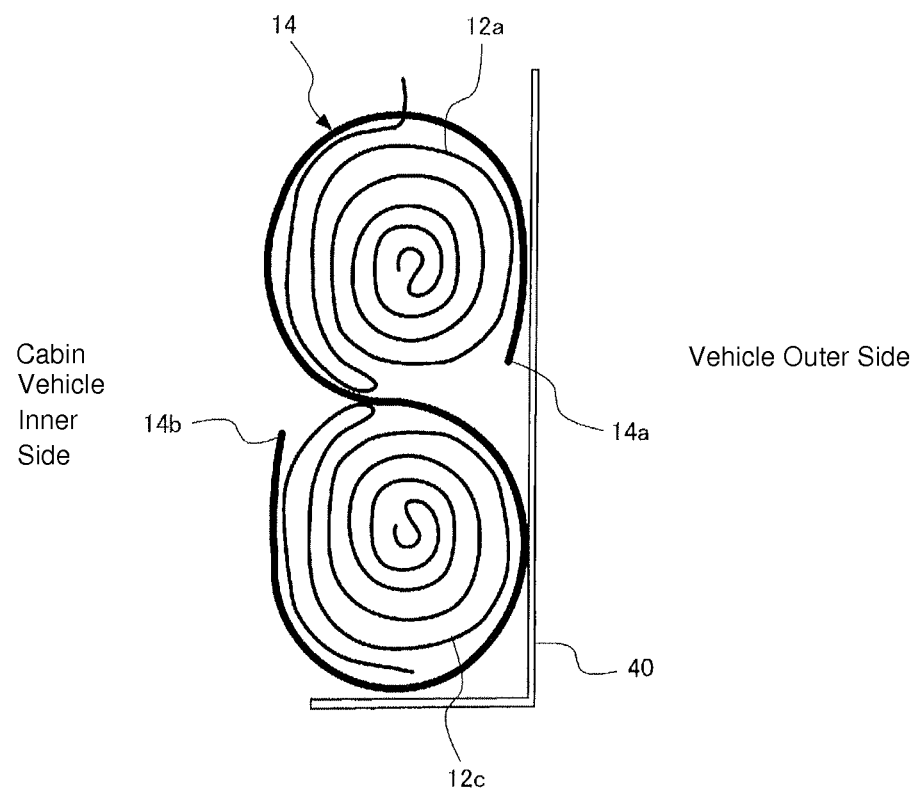
FIG. 6 is an illustrative view (sectional view) showing a deployment operation of the curtain airbag device according to this embodiment of the present invention in a stowed state (a pre-deployment state)
Figure 7:
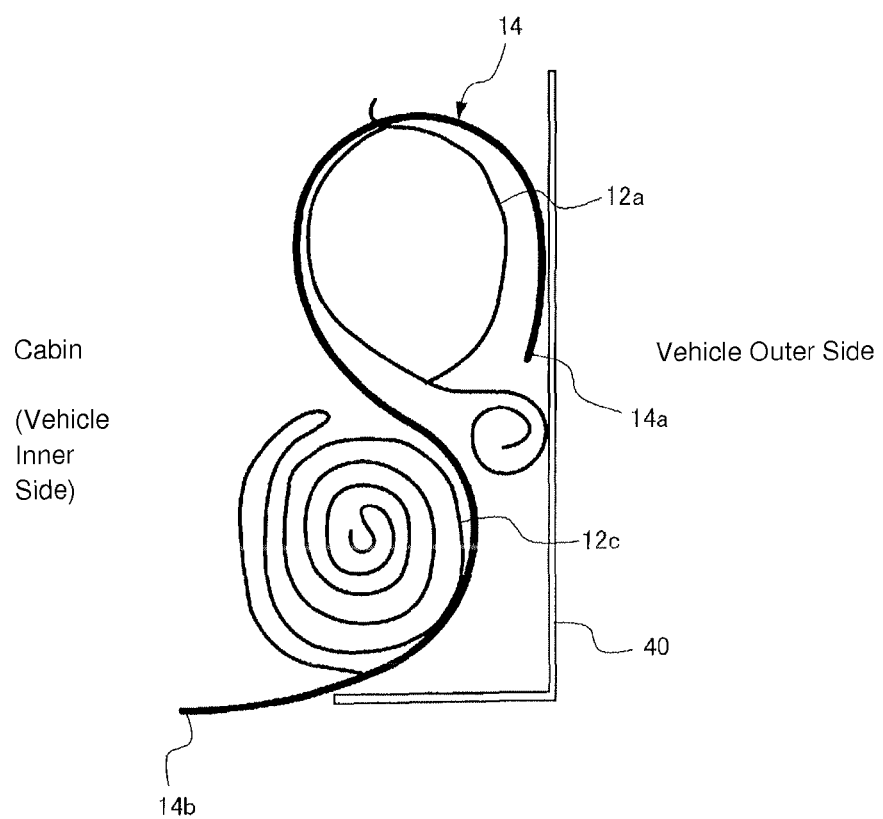
FIG. 7 is an illustrative view (sectional view) showing the deployment operation of the curtain airbag device according to this embodiment of the present invention in an initial deployment state.

Next, a deployment operation of the airbag 12 according to this embodiment will be described with reference to FIGS. 6 to 8. In a state prior to activation of the airbag device, the airbag 12 is stowed inside a jump bracket 40, as shown in FIG. 6. When the expansion gas generated by the inflator subsequently flows through the gas introduction ports 24a, 24b, the chambers 20 are expanded via the duct 26. At this time, as shown in FIG. 7, the airbag main portion 12a deploys first, but the restricting member 14 causes the airbag main portion 12a to deploy toward the vehicle outer side.

Figure 8:
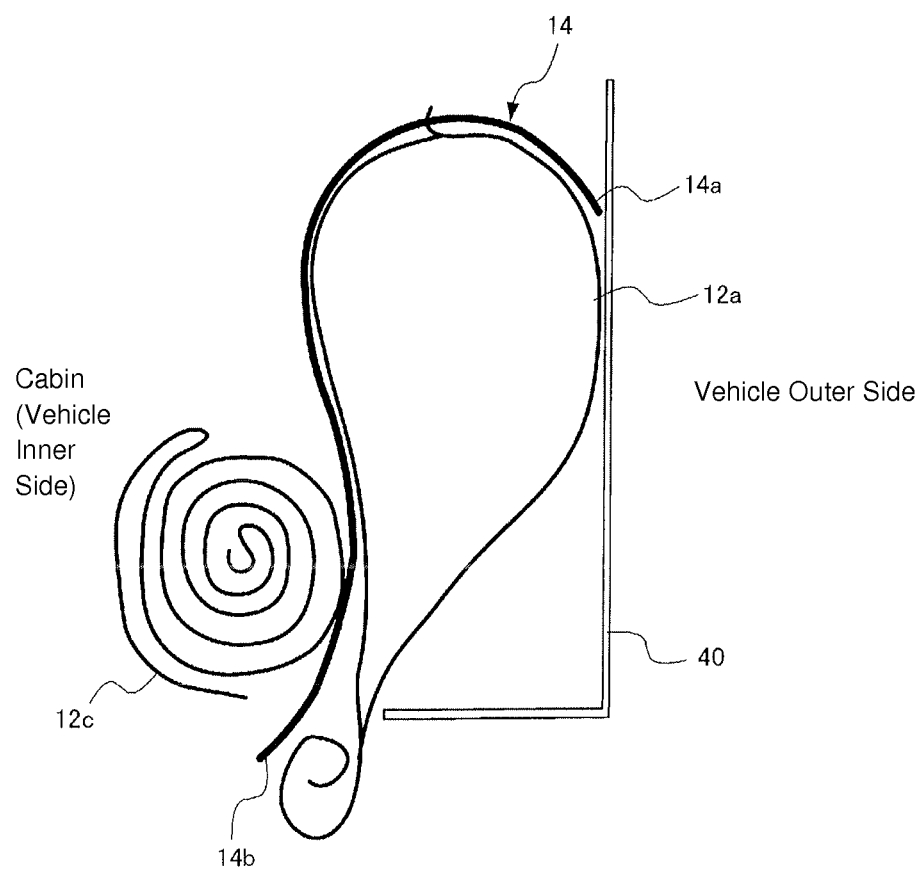
FIG. 8 is an illustrative view (sectional view) showing the deployment operation of the curtain airbag device according to this embodiment of the present invention in an intermediate deployment state.

When the airbag main portion 12a deploys further, the turned-back end portion 12c is guided to the vehicle inner side by the pressure of the airbag main portion 12a due to the existence of the restricting member 14, as shown in FIG. 8. The turned-back end portion 12c then deploys such that the airbag 12 enters a fully deployed state. Here, the turned-back end portion 12c deploys toward the vehicle inner side, and therefore a situation in which the airbag 12 enters in between the pillar garnish and the pillar can be avoided, thereby enabling smooth deployment of the airbag 12.

Figure 9:
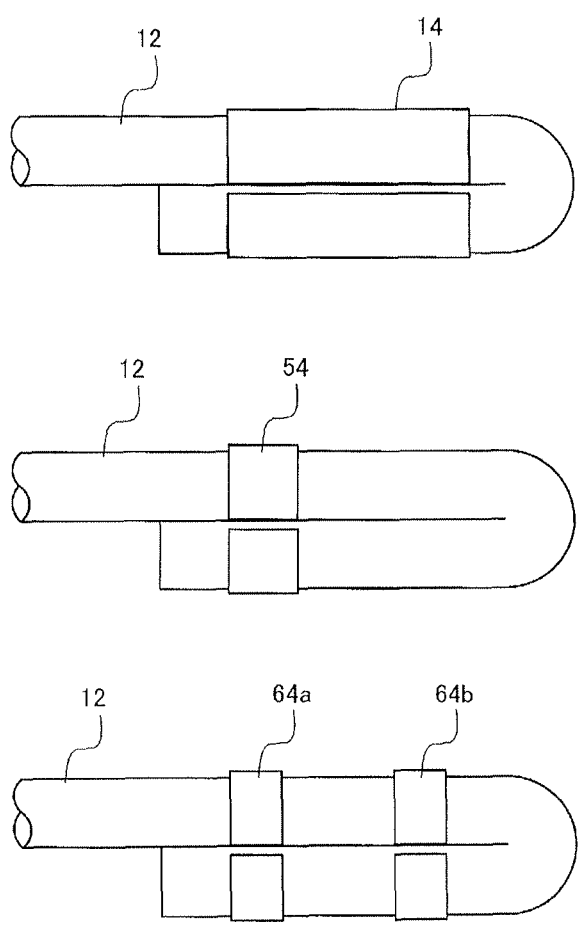
FIG. 9 is an illustrative view showing variations of the restricting member employed in the curtain airbag device according to the present invention.

FIG. 9 is an illustrative view showing variations of the restricting member employed in the curtain airbag device according to the present invention. As shown in FIG. 9, in addition to the strip-shaped restricting member 14 formed from a single wide sheet described above, a strip-shaped restricting member 54 formed from a single narrow sheet or two restricting members 64a, 64b may be employed as the restricting member. Further, these restricting members 54, 64a, 64b may likewise be formed integrally with the protective member 30.

An embodiment of the present invention was described above, but the present invention is not limited to the above embodiment and may be subjected to various design modifications and the like within a scope that does not depart from the technical spirit set forth in the claims. The curtain airbag device according to the present invention may be applied to various types of vehicles including SUV type and wagon type three-row passenger vehicles, two-row passenger vehicles, and so on.

The invention claimed is:

1. An airbag device that deploys in a curtain shape on a side portion of a vehicle interior in order to protect an occupant of the vehicle interior, the device comprising:
a gas generator that generates an expansion gas;
an airbag that deploys when expanded by the expansion gas from the gas generator is supplied into an interior of the airbag, wherein the airbag has a deployed configuration and a stowed configuration, wherein, in the stowed configuration, the airbag is compressed into an elongated shape and an end portion of the compressed elongated airbag is folded back in a lengthwise direction toward a center of the airbag, the airbag thereby forming an airbag main portion that is not turned back and a turned-back end portion, the turned-back end portion of the airbag is folded back along a lower side of the airbag main portion; and
a restricting member restricting the turned-back end portion of the airbag against deployment in a direction toward a vehicle outer side when the device is activated, the restricting member has an S-shaped cross-section, a portion of the restricting member extending between the airbag main portion and the turned-back end portion from a vehicle inner side surface of the airbag main portion, the restricting member covering a vehicle outer side surface of the end portion.

2. The airbag device according to claim 1, wherein the restricting member is formed into a strip shape that extends in a substantially orthogonal direction with respect to the lengthwise direction of the airbag.

3. The airbag device according to claim 1, further comprising a protective member that covers a periphery of the airbag in the compressed state, wherein the restricting member is formed as a part of the protective member.

4. The airbag device according to claim 1, wherein a lower side end portion of the restricting member extends to a vehicle inner side from a bottom portion of the turned-back end portion.

5. The airbag device according to claim 1, wherein the restricting member is connected to the airbag near an upper surface of the airbag main portion.

6. The airbag device according to claim 5, wherein a slit is provided in a part of the restricting member, and the restricting member is connected to the airbag by passing a tab provided on the airbag main portion through the slit.

7. An airbag device that deploys in a curtain shape on a side portion of a vehicle interior in order to protect an occupant of the vehicle interior, the device comprising:
a gas generator that generates an expansion gas;
an airbag that deploys when expanded by the expansion gas from the gas generator is supplied into an interior of the airbag, wherein the airbag has a deployed configuration and a stowed configuration, wherein, in the stowed configuration, the airbag is compressed into an elongated shape and an end portion of the compressed elongated airbag is folded back in a lengthwise direction toward a center of the airbag, the airbag thereby forming an airbag main portion that is not turned back and a turned-back end portion; and
a restricting member restricting the turned-back end portion of the airbag against deployment in a direction toward a vehicle outer side when the device is activated, the restricting member includes a stretching region that stretches more easily than other regions of the restricting member when the airbag moves from the stowed configuration to the deployed configuration.

8. The airbag device according to claim 7, wherein the stretching region comprises a slit provided in the restricting member.

9. The airbag device according to claim 7, wherein the stretching region comprises a thin region having a thickness that is thinner than other portions of the restricting member.

* * * * *